(12) United States Patent
Droege

(10) Patent No.: US 7,556,437 B2
(45) Date of Patent: Jul. 7, 2009

(54) FIBER OPTIC CONNECTOR WITH PROTECTIVE CAP

(75) Inventor: Scott Droege, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/047,400

(22) Filed: Mar. 13, 2008

(65) Prior Publication Data

US 2008/0226234 A1    Sep. 18, 2008

Related U.S. Application Data

(60) Provisional application No. 60/906,786, filed on Mar. 13, 2007.

(51) Int. Cl.
  *G02B 6/38* (2006.01)
  *G02B 6/00* (2006.01)
(52) U.S. Cl. .................... 385/60; 385/72; 385/139
(58) Field of Classification Search ............ None
  See application file for complete search history.

(56) References Cited

U.S. PATENT DOCUMENTS

| | | | |
|---|---|---|---|
| 4,140,367 A | 2/1979 | Makuch et al. | |
| 4,793,683 A | 12/1988 | Cannon, Jr. et al. | |
| 4,907,853 A | 3/1990 | Hiratsuka | |
| 5,276,750 A | 1/1994 | Manning | |
| 5,590,229 A | 12/1996 | Goldman et al. | |
| 5,751,874 A | 5/1998 | Chudoba | |
| 5,923,804 A | 7/1999 | Rosson | |
| 6,149,313 A | 11/2000 | Giebel et al. | |
| 6,234,683 B1 | 5/2001 | Waldron et al. | |
| 6,305,849 B1 | 10/2001 | Roehrs et al. | |
| 6,579,014 B2 | 6/2003 | Melton et al. | |
| 6,648,520 B2 * | 11/2003 | McDonald et al. | 385/78 |
| 6,739,759 B1 | 5/2004 | Seeley | |

(Continued)

FOREIGN PATENT DOCUMENTS

EP    0 581 527 A1    2/1994

(Continued)

OTHER PUBLICATIONS

Opti Tap™ Connector. An Evolant Solutions Product, 2 pages (Sep. 2005).

(Continued)

*Primary Examiner*—Omar Rojas
(74) *Attorney, Agent, or Firm*—Merchant & Gould P.C.

(57) ABSTRACT

A fiber optic connector assembly includes a fiber optic connector having an outer housing with a connector interface end, a connector interface housing mounted at the connector interface end, and a retention nut rotatably mounted about the outer housing. The connector interface housing has a first end supporting a ferrule and a second end forming a base supported by a retention block mounted within the outer housing. A cap for covering the connector interface end includes internal threads and a stabilizing element. The internal threads receive external threads of the retention nut such that the retention nut secures the cap to the fiber optic connector. The stabilizing element is positioned within the cap and compresses against the retention block when the cap is secured to the fiber optic connector by the retention nut to maintain alignment of the connector interface housing relative to the outer housing.

10 Claims, 5 Drawing Sheets

U.S. PATENT DOCUMENTS

| | | |
|---|---|---|
| 6,783,281 B2 | 8/2004 | Cheng |
| 6,848,836 B2 | 2/2005 | Ueda et al. |
| 6,899,467 B2 * | 5/2005 | McDonald et al. ............ 385/78 |
| 6,916,120 B2 | 7/2005 | Zimmel et al. |
| 6,962,445 B2 | 11/2005 | Zimmel et al. |
| 7,090,406 B2 | 8/2006 | Melton et al. |
| 7,090,407 B2 * | 8/2006 | Melton et al. ................. 385/62 |
| 7,111,990 B2 | 9/2006 | Melton et al. |
| 7,113,679 B2 | 9/2006 | Melton et al. |
| 7,137,742 B2 | 11/2006 | Theuerkorn et al. |
| 7,146,090 B2 | 12/2006 | Vo et al. |
| 7,234,877 B2 | 6/2007 | Sedor |
| 7,244,066 B2 | 7/2007 | Theuerkorn |
| 7,264,402 B2 | 9/2007 | Theuerkorn et al. |
| 7,331,719 B2 | 2/2008 | Manning et al. |
| 7,346,256 B2 | 3/2008 | Marrs et al. |
| 7,380,992 B2 | 6/2008 | Kramer et al. |
| 2001/0012428 A1 | 8/2001 | Nakajima et al. |
| 2003/0063867 A1 | 4/2003 | McDonald et al. |
| 2004/0033028 A1 | 2/2004 | Cheng |
| 2004/0047566 A1 | 3/2004 | McDonald et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0041928 A1 | 2/2005 | Zimmel et al. |
| 2006/0089049 A1 | 4/2006 | Sedor |
| 2007/0025665 A1 | 2/2007 | Dean, Jr. et al. |
| 2007/0077010 A1 | 4/2007 | Melton et al. |
| 2008/0175542 A1 | 7/2008 | Lu et al. |
| 2008/0175546 A1 | 7/2008 | Lu et al. |

FOREIGN PATENT DOCUMENTS

| | | |
|---|---|---|
| EP | 0 940 700 A2 | 9/1999 |
| EP | 1 172 671 A1 | 1/2002 |
| EP | 1 457 793 A2 | 9/2004 |
| EP | 1 566 674 A1 | 8/2005 |
| WO | WO 00/31575 | 6/2000 |
| WO | WO 2005/072395 A2 | 8/2005 |

OTHER PUBLICATIONS

Stratos Lightwave™ Brochure, "HDLC Hermaphroditic Butt Joint Connector," 2 pages (known as prior art at least as early as Sep. 8, 2003).

Stratos Lightwave™ Brochure, "HQLC Hermaphroditic Butt Joint Connector," 2 pages (known as prior art at least as early as Sep. 8, 2003).

* cited by examiner

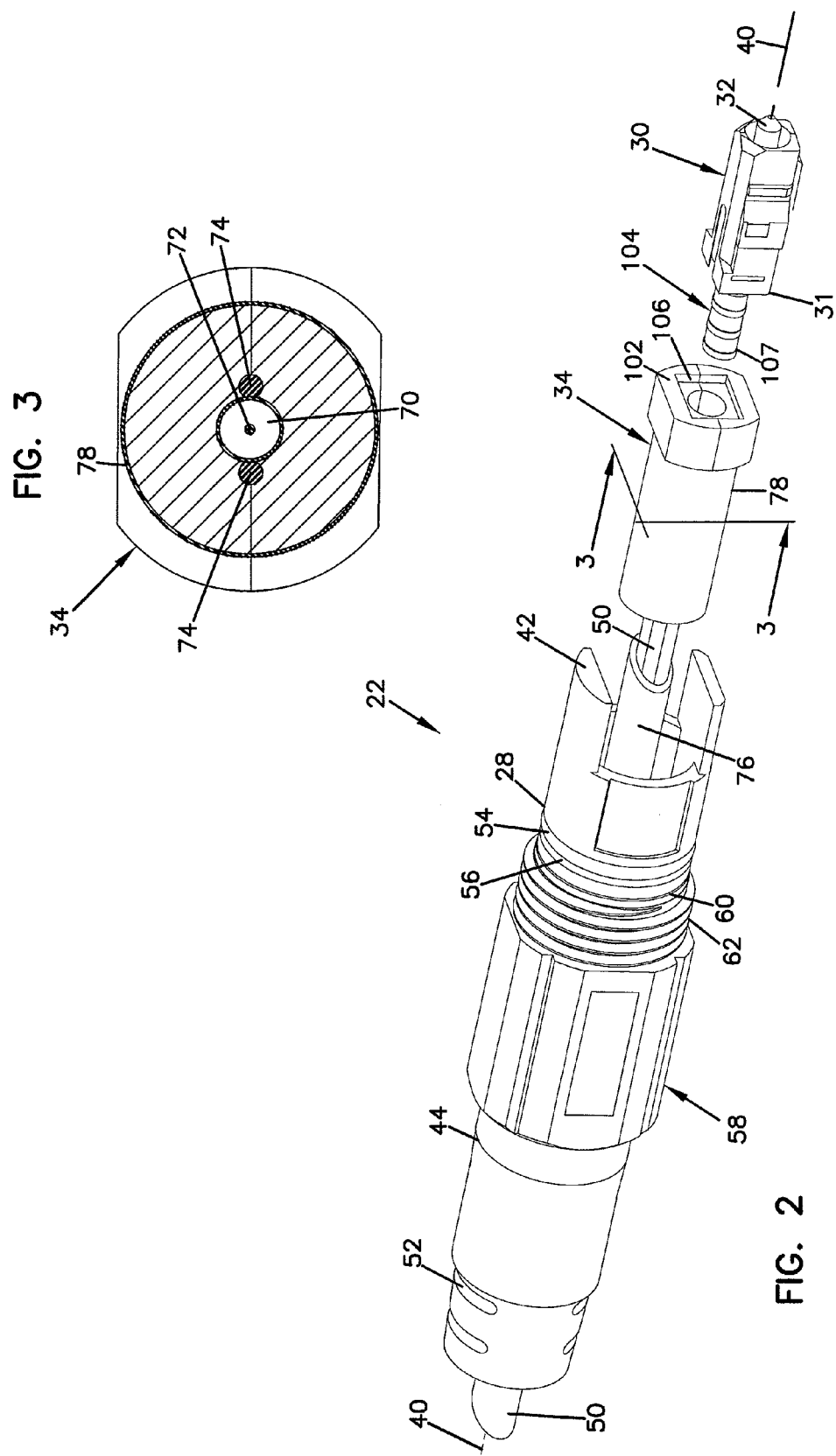

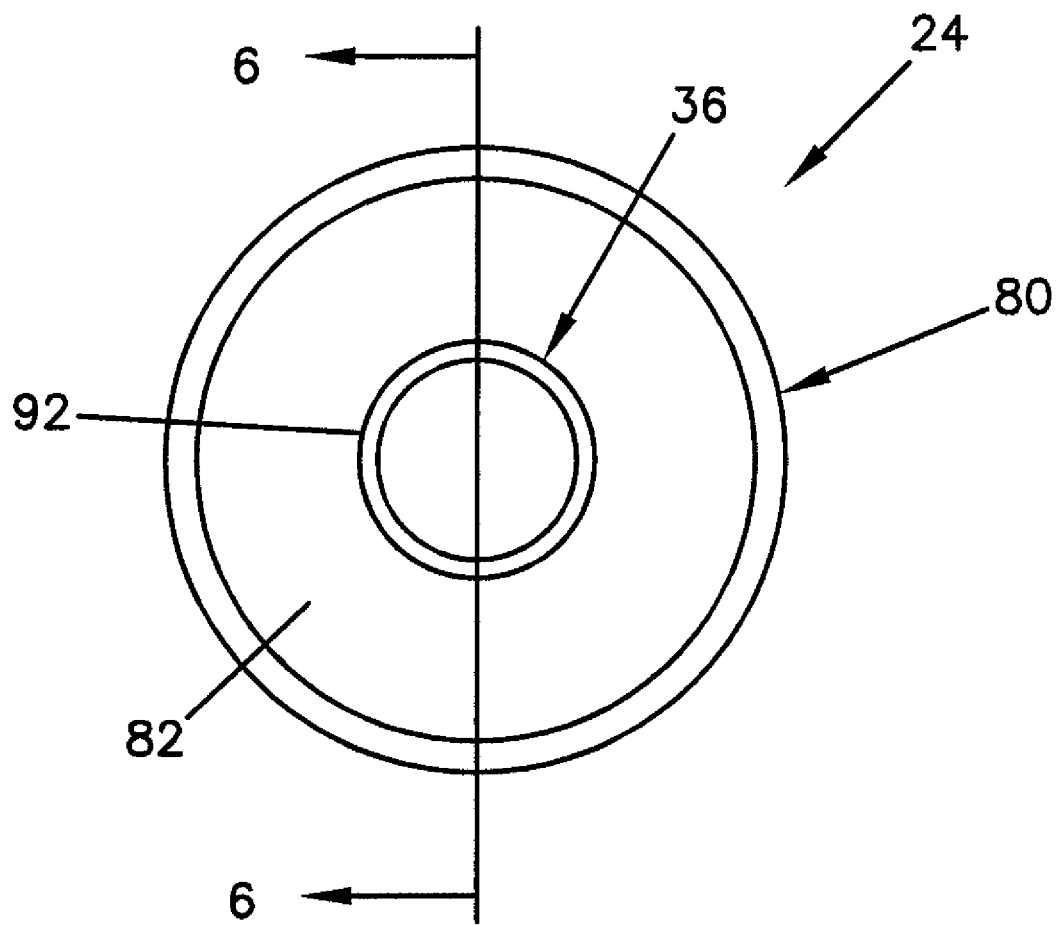

FIBER OPTIC CONNECTOR WITH PROTECTIVE CAP

CROSS REFERENCE TO RELATED APPLICATION

This application claims the benefit of U.S. Provisional Patent Application Ser. No. 60/906,786 filed Mar. 13, 2007, which application is hereby incorporated by reference in its entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

SUMMARY

One aspect of the present disclosure relates to an assembly including a fiber optic connector having an interface end that can be covered by a protective cap. The interface end of the fiber optic connector includes a ferrule. Structure is provided within the protective cap for preventing misalignment of a ferrule.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 2 is an exploded view of the fiber optic connector of FIG. 1;

FIG. 3 is a cross-sectional view taken along section line 3-3 of FIG. 2;

FIG. 5 is an end view of the protective cap of FIG. 4;

DETAILED DESCRIPTION

Figure 1:
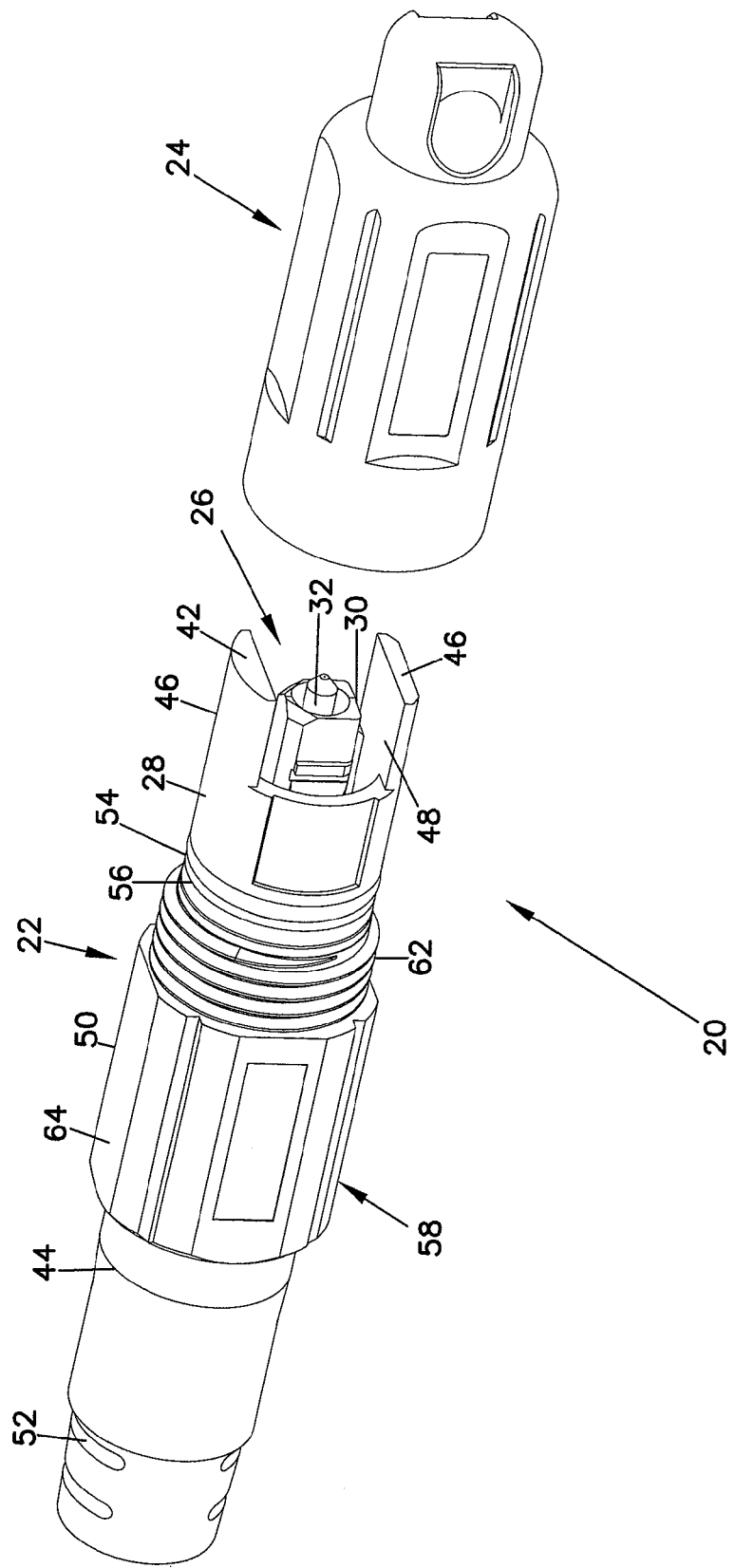
FIG. 1 is a perspective view of an example fiber optic connector and a protective cap having features that are examples of inventive aspects in accordance with the principles of the present disclosure.
Figure 7:
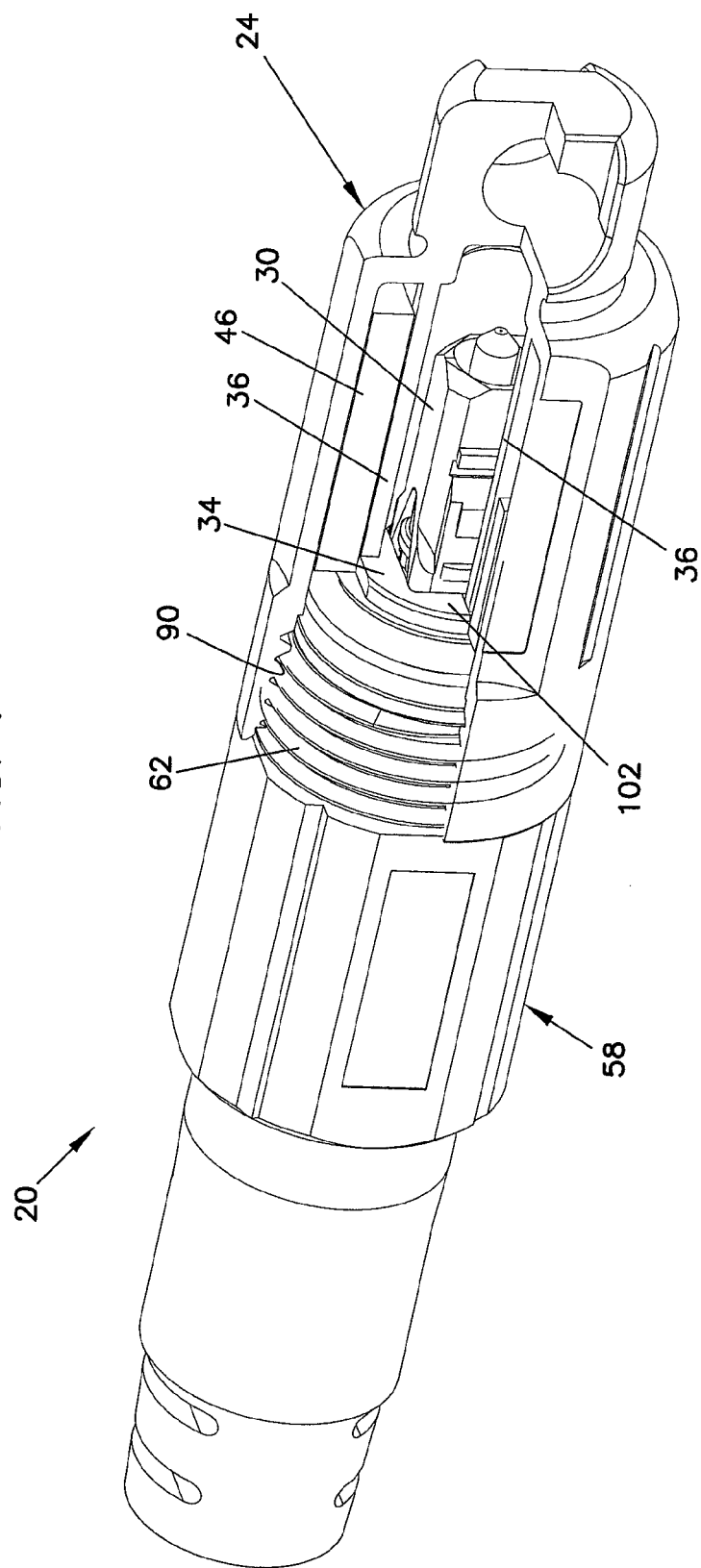
FIG. 7 is an assembled, partially cut-away view of the fiber optic connector and protective cap of FIG. 1.

FIG. 1 illustrates a fiber optic connector assembly 20 having features that are examples of inventive aspects in accordance with the principles of the present disclosure. The fiber optic connector assembly 20 includes a fiber optic connector 22 and a cap 24 for protecting a connector interface end 26 of the fiber optic connector 22. The fiber optic connector 22 includes an outer housing 28 and a connector interface housing 30. The connector interface housing 30 supports a ferrule 32 located at the connector interface end 26 of the fiber optic connector 22. Referring to FIG. 2, a base end 31 of the connector interface housing 30 is supported at a retention block 34 mounted within the outer housing 28. A stabilizing structure 36 (see FIG. 7) is provided within the cap 24 for maintaining alignment of the connector interface housing 30 and ferrule 32 relative to the outer housing 28. When the cap 24 is mounted over the connector interface end 26 of the fiber optic connector 22, the stabilizing structure 36 compresses against the retention block 34 to prevent movement of the retention block 34 thereby ensuring that the connector interface housing 30 and its corresponding ferrule 32 are properly oriented relative to the outer housing 28.

The outer housing 28 of the fiber optic connector 22 is elongated along a central axis 40 and includes a first end 42 positioned opposite from a second end 44. The first end 42 of the outer housing 28 is positioned at the connector interface end 26 of the fiber optic connector 22 and includes a pair of opposing extensions or paddles 46 positioned on opposite sides of the connector interface housing 30. The paddles 46 are generally parallel to the central axis 40 and are separated from one another by a gap 48 in which the connector interface housing 30 is located. The second end 44 of the outer housing 28 is adapted to receive a fiber optic cable 50. A resilient boot 52 can be positioned over the second end 44 of the outer housing 28 to provide bend radius protection at the interface between the outer housing 28 and the fiber optic cable 50.

Referring still to FIG. 1, the outer housing 28 of the fiber optic connector 22 defines an outer circumferential groove 54 positioned near the first end 42 of the outer housing 28. A sealing member 56 such as a resilient O-ring is mounted in the circumferential groove 54. The fiber optic connector 22 also includes a retention nut 58 rotatably mounted about the exterior of the outer housing 28. The retention nut 58 is mounted between the resilient boot 52 and an outer shoulder 60 of the outer housing 28 and is free to be manually turned relative to the outer housing 28 about the central axis 40. The retention nut 58 includes an externally threaded portion 62 and a gripping portion 64. The gripping portion 64 includes a plurality of flats that allow the gripping portion 64 to be easily grasped to facilitate manually turning the retention nut 58 about the central axis 40.

The fiber optic cable 50 can include at least one optical fiber capable of carrying optical signals. The optical fiber can include a core surrounded by cladding. The core is the light-conducting central portion of the optical fiber. The cladding surrounds the core and is composed of a material having a lower index of refraction than the material of the core. Light is internally reflected within the core to transmit the optical signal along the core. The optical fiber can be protected within a buffer tube. The fiber optic cable can also include strength members within the fiber optic cable to increase the tensile strength of the fiber optic cable. The optical fiber, strength members, buffer tube and other cable components can be surrounded by an outer jacket or sheath that provides a protective covering for the cable components. As shown at FIGS. 2 and 3, the fiber optic cable 50 includes a central buffer tube 70 containing at least one optical fiber 72. Strength members 74 are positioned on opposite sides of the central buffer tube 70. The strength members 74 and the buffer tube 70 are positioned within an outer jacket 76 of the fiber optic cable 50.

The fiber optic cable 50 enters the fiber optic connector 22 through the second end 44 of the outer housing 28. The optical fiber 72 of the fiber optic cable 50 has an end portion that is mounted within the ferrule 32. As shown at FIG. 3, the buffer tube 70 and the strength members 74 of the fiber optic cable 50 are anchored within corresponding slots provided within the retention block 34. In certain embodiments, a bonding material such as an adhesive (e.g., epoxy) can be used to anchor the strength members 74 and the buffer tube 70 within the retention block 34. A crimp sleeve 78 is mounted about the exterior of the retention block 34 to further mechanically secure the strength members 74 and the buffer tube 70 within the retention block 34. The base end 31 of the connector interface housing 30 is anchored within a recess 106 provided within an end face 102 of the retention block 34. The fiber optic connector 22 also includes a ferrule holder 104 positioned within the connector interface housing 30 for supporting the ferrule 32. A base end 107 of the ferrule holder 104 is also anchored within the retention block 34. When the fiber optic connector 22 is assembled, the retention block 34 is anchored (e.g., bonded by an adhesive material) within the outer housing 28 with the connector interface housing 30 positioned between the paddles 46 at the connector interface end 26 of the fiber optic connector 22.

Figure 4:
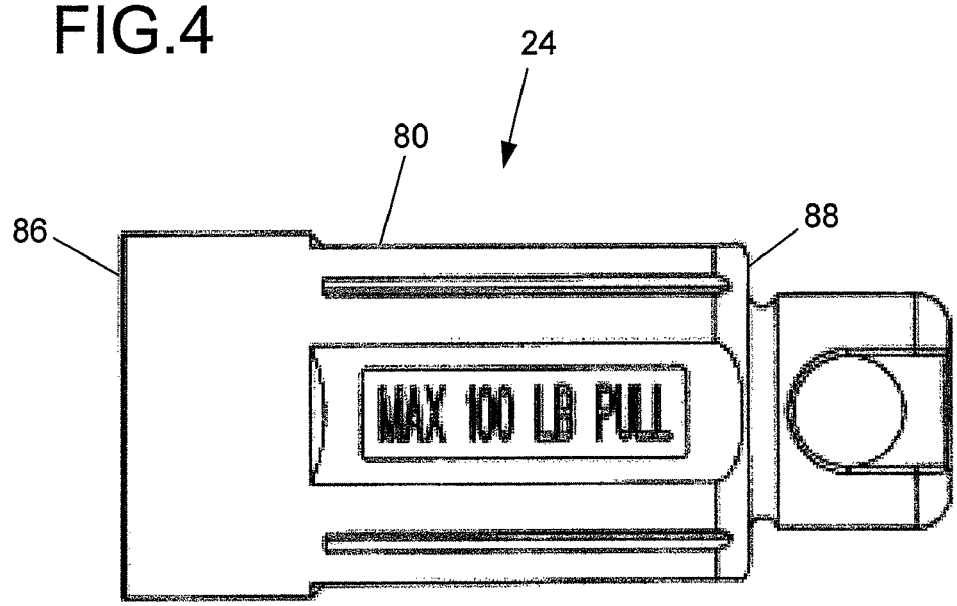
FIG. 4 is a side view of the protective cap of FIG. 1.
Figure 6:
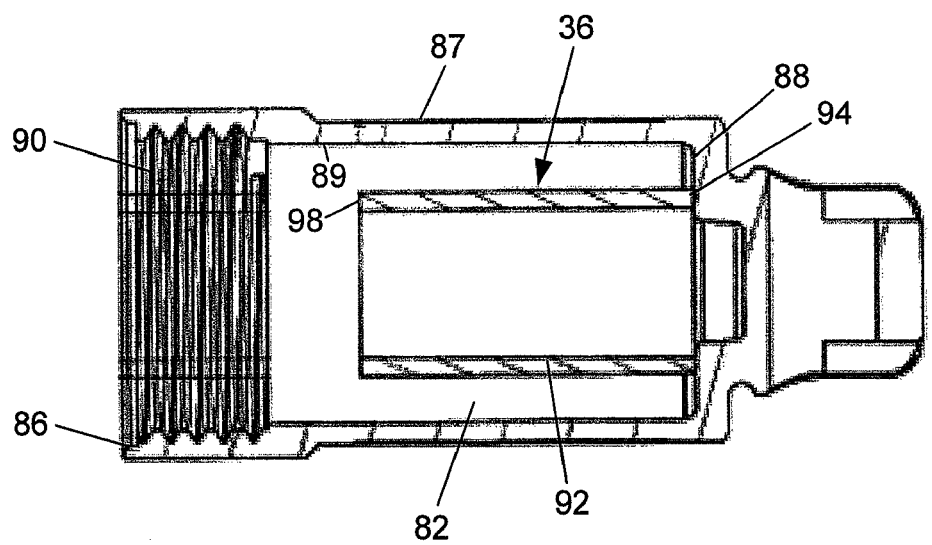
FIG. 6 is a cross-sectional view taken along section line 6-6 of FIG. 5.

Referring now to FIGS. 4-6, the cap 24 of the fiber optic connector assembly 20 includes a cap housing 80 defining an interior 82 adapted to receive the connector interface end 26 of the fiber optic connector 22. The cap housing 80 includes an open end 86 positioned opposite from a closed end 88. A generally cylindrical outer wall 87 of the cap housing 80 extends from the open end 86 to the closed end 88. Internal threads 90 are defined at the inside surface of the outer wall 87 adjacent the open end 86 of the cap housing 80. The inside surface of the outer wall 87 also includes a sealing surface 89 provided adjacent the internal threads 90. The stabilizing structure 36 is provided within the interior 82 adjacent the closed end 88 of the cap housing 80. In the depicted embodiment, the stabilizing structure 36 is shown as a cylindrical member 92 having a base end 94 integrally formed with the closed end 88 of the cap housing 80. In alternative embodiments, the cylindrical member 92 can be a separate element from the cap housing 80. The cylindrical member 92 has an inner diameter sized larger than a perimeter of the connector interface housing 30 such that the connector interface housing 30 can fit within the interior of the stabilizing structure 36. The stabilizing structure 36 also includes an end 98 adapted to engage the end face 102 of the retention block 34 when the cap 24 is mounted over the connector interface end 26 of the fiber optic connector 22. In certain embodiments, the cap 24 and the stabilizing structure 36 have a molded plastic construction and can be molded as a unitary one-piece part.

In use, the cap 24 is inserted over connector interface end 26 of the fiber optic connector 22 to protect the connector interface housing 30 and its corresponding ferrule 32. Once the cap 24 is inserted over the connector interface end 26, the externally threaded portion 62 of the retention nut 58 is threaded into the internal threads 90 of the cap 24. As the retention nut 58 is tightened, the cap 24 is drawn toward the fiber optic connector 22 until the end 98 of the stabilizing structure 36 seats firmly against the end face 102 of the retention block 34. As so positioned, the connector interface housing 30 is positioned within the cylindrical member 92 with the cylindrical member 92 and the ferrule 32 being concentric with the central axis 40 (see FIG. 7). Furthermore, the paddles 46 of the fiber optic connector 22 are located between the cylindrical member 92 and the outer wall 87 of the cap housing 80. With the cap 24 positioned as described above, the cylindrical member 92 presses against the end face 102 of the retention block 34 to prevent forward movement or lateral tilting of the retention block 34 within the outer housing 28 of the fiber optic connector 22. In this way, misalignment of the connector interface housing 30 and its corresponding ferrule 32 with respect to the central axis 40 is prevented. Additionally, the sealing member 56 of the fiber optic connector 22 contacts the sealing surface 89 within the cap housing 80 to form an annular seal that prevents moisture or other contaminants from reaching the connector interface end 26 of the fiber optic connector 22.

From the forgoing detailed description, it will be evident that modifications and variations can be made in the devices of the disclosure without departing from the spirit or scope of the invention.

What is claimed is:

1. A fiber optic connector assembly comprising:
   a fiber optic connector including an outer housing having a connector interface end, the fiber optic connector also including a connector interface housing mounted at the connector interface end of the outer housing, the connector interface housing having a first end supporting a ferrule and a second end forming a base supported by a retention block mounted within the outer housing, the fiber optic connector further including a retention nut rotatably mounted about the outer housing, the retention nut having external threads;
   a cap for covering the connector interface end, the cap having internal threads that receive the external threads of the retention nut such that the retention nut secures the cap to the fiber optic connector; and
   a stabilizing element positioned within the cap that compresses against the retention block when the cap is secured to the fiber optic connector by the retention nut, wherein the stabilizing element maintains alignment of the connector interface housing relative to the outer housing.

2. The fiber optic connector assembly of claim 1, wherein the stabilizing element is integral with the cap.

3. The fiber optic connector assembly of claim 1, wherein the cap and the stabilizing element are molded as a one-piece plastic part.

4. The fiber optic connector assembly of claim 1, wherein the stabilizing element is a generally cylindrical member.

5. The fiber optic connector assembly of claim 4, wherein the cap includes a cap housing with an open end and a closed end, and wherein the generally cylindrical member has a base end that is integral with the closed end of the cap housing and a free end that engages an end face of the retention block when the cap is secured to the fiber optic connector.

6. The fiber optic connector assembly of claim 5, wherein the connector interface housing is received within an interior of the generally cylindrical member.

7. The fiber optic connector assembly of claim 6, wherein the connector interface end of the outer housing includes paddles positioned on opposite sides of the connector interface housing, wherein the cap includes an outer wall, and wherein the paddles fit between the generally cylindrical member and the outer wall when the cap is secured to the fiber optic connector.

8. The fiber optic connector assembly of claim 1, wherein the connector interface housing is received within the stabilizing element when the cap is secured to the fiber optic connector.

9. The fiber optic connector assembly of claim 8, wherein the stabilizing element includes an end that is compressed against an end face of the retention block when the cap is secured to the fiber optic connector.

10. The fiber optic connector assembly of claim 8, wherein the connector interface end of the outer housing includes paddles positioned on opposite sides of the connector interface housing, wherein the cap includes an outer wall, and wherein the paddles fit between the stabilizing element and the outer wall when the cap is secured to the fiber optic connector.

* * * * *